(12) United States Patent
Lin

(10) Patent No.: US 10,168,135 B2
(45) Date of Patent: Jan. 1, 2019

(54) DEVICE FOR MEASURING CONTAINER AND METHOD USING THE SAME

(71) Applicant: Hsin-Chuen Lin, Fremont, CA (US)

(72) Inventor: Hsin-Chuen Lin, Fremont, CA (US)

( * ) Notice: Subject to any disclaimer, the term of this patent is extended or adjusted under 35 U.S.C. 154(b) by 109 days.

(21) Appl. No.: 15/607,492

(22) Filed: May 28, 2017

(65) Prior Publication Data

US 2018/0340764 A1    Nov. 29, 2018

(51) Int. Cl.
*G01B 3/08* (2006.01)
*G01B 5/06* (2006.01)

(52) U.S. Cl.
CPC .............. *G01B 5/061* (2013.01); *G01B 3/08* (2013.01)

(58) Field of Classification Search
CPC ............ G01B 3/08; G01B 5/06; G01B 5/061
USPC ............... 33/452, 464, 486, 494, 522
See application file for complete search history.

(56) References Cited

U.S. PATENT DOCUMENTS

| 776,897 | A | * | 12/1904 | Ferris | B43L 9/04 33/27.03 |
| 1,039,057 | A | * | 9/1912 | Hill | C03B 33/04 33/27.04 |
| 1,298,995 | A | * | 4/1919 | Michalovitz | B25H 7/04 33/448 |
| 2,027,494 | A | * | 1/1936 | Trabold | G01F 19/00 33/486 |
| 2,197,505 | A | * | 4/1940 | Mosher | B25H 7/04 33/452 |
| 2,594,193 | A | * | 4/1952 | Bram Mendes | B43L 13/00 33/26 |
| 3,243,883 | A | * | 4/1966 | Morgan | G01C 21/20 33/1 M |
| 5,617,642 | A | * | 4/1997 | Marios | B25H 7/02 33/452 |
| 6,694,633 | B1 | * | 2/2004 | Nyquist | B43L 7/10 33/23.01 |
| 7,254,898 | B1 | * | 8/2007 | Armstrong | B43L 7/007 33/419 |
| 2009/0320307 | A1 | * | 12/2009 | Richter | G01B 3/205 33/512 |
| 2011/0277331 | A1 | * | 11/2011 | Glomb, Sr. | G01B 3/04 33/404 |
| 2012/0096726 | A1 | * | 4/2012 | Glock, Jr. | A61B 5/1072 33/512 |
| 2013/0152416 | A1 | * | 6/2013 | Yi | G01B 3/08 33/464 |
| 2014/0101952 | A1 | * | 4/2014 | Schmitten | B43L 13/001 33/493 |

(Continued)

*Primary Examiner* — G. Bradley Bennett

(57) ABSTRACT

A device for measuring container includes an elongated guide plate transversely mounted on an open top of a container. At least one elongated ruler is inserted into an interior of the container from the open top, and the end face of the distal end of the at least one elongated ruler contacts the inner end of the interior. The mediate section of the at least one elongated ruler contacts the elongated guide plate to obtain a first index. The at least one elongated ruler is moved to the exterior of the container and contacts a surface which is located on a common surface with the underside of the exterior of the container. The mediate section of the at least one elongated ruler contacts the elongated guide plate to obtain a second index. The difference between the first and second indexes is the thickness of the bottom of the container.

14 Claims, 8 Drawing Sheets

(56) References Cited

U.S. PATENT DOCUMENTS

| | | | |
|---|---|---|---|
| 2015/0016907 A1* | 1/2015 | Frick | B23B 47/287 |
| | | | 408/115 R |
| 2017/0191828 A1* | 7/2017 | Haney | G01C 5/00 |
| 2017/0254631 A1* | 9/2017 | Lee | G01B 5/063 |
| 2017/0299387 A1* | 10/2017 | Bryan | G01B 11/0608 |

* cited by examiner

DEVICE FOR MEASURING CONTAINER AND METHOD USING THE SAME

BACKGROUND OF THE INVENTION

1. Fields of the Invention

The present invention relates to a device for measuring container and a method using the same, and more particularly, to a device that mounted to the top of the container to measure thickness of bottom of a container.

2. Descriptions of Related Art

There is no any device or other comparatively good device that is designed to measure thickness of bottom of a container. When pottery creator making a ceramic works or the like, a clay embryonic form 60 is obtained by a pull embryo Technique firstly, and then the clay embryonic form 60 should be trimmed to match the requirement of modeling of the creator, as shown in FIG. 8. In general, a ceramic container has a circular ring-shaped support 62 defined at it underside, so a clay embryonic form 60 of the ceramic container should be trimmed at the bottom of the clay embryonic form 60 to remove partial clay to form a recess 61 and obtain the circular ring-shaped support 62 around the recess 61. However, because there is no a proper or excellent device designed to measure the thickness of the bottom of the object, the maker can only roughly measure the thickness of the bottom of the clay embryonic form 60 for trimming the extra clay away. Such way of roughly measuring the thickness of the bottom of the clay embryonic form 60, the pottery creator has no information of precise thickness of the bottom of the clay embryonic form 60 results in the thickness of the bottom of the finished ceramic container work cannot be properly controlled. Too large thickness of the bottom of the finished work may be too heavy for use. Too lower thickness of the bottom of the clay embryonic form 60 may be ruptured after kiln burned.

SUMMARY OF THE INVENTION

The present invention relates to a device for measuring thickness of bottom of an object and comprises an elongated guide plate transversely mounted on an open top of a container. At least one elongated ruler is inserted into an interior of the container from the open top, and the end face of the distal end of the at least one elongated ruler contacts the inner end of the interior. The mediate section of the at least one elongated ruler contacts the elongated guide plate to obtain a first index. The at least one elongated ruler is moved to the exterior of the container and contacts a surface which is located on a common surface with the underside of the exterior of the container. The mediate section of the at least one elongated ruler contacts the elongated guide plate to obtain a second index. The difference between the first and second indexes is the thickness of the bottom of the container.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
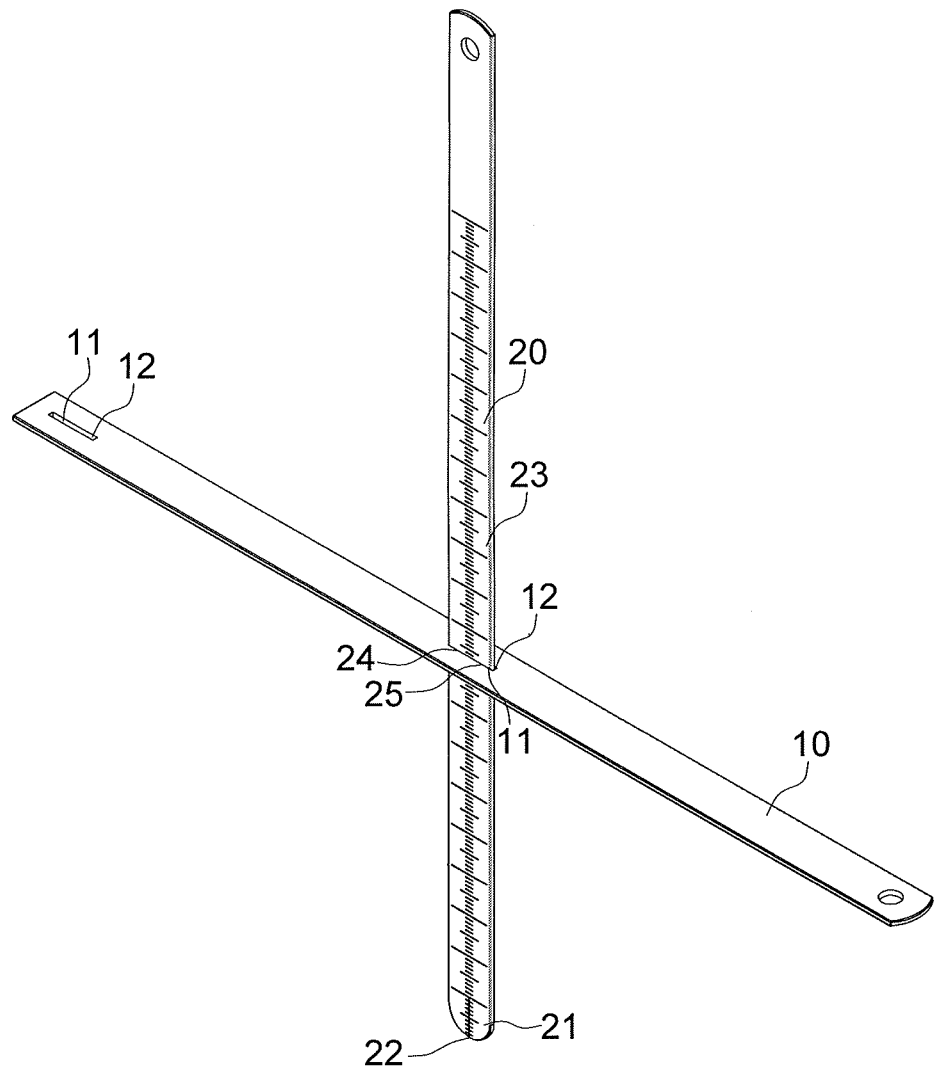
FIG. 1 shows that the ruler is located at the mediate portion of the elongated guide plate of the device of the present invention.
Figure 2:
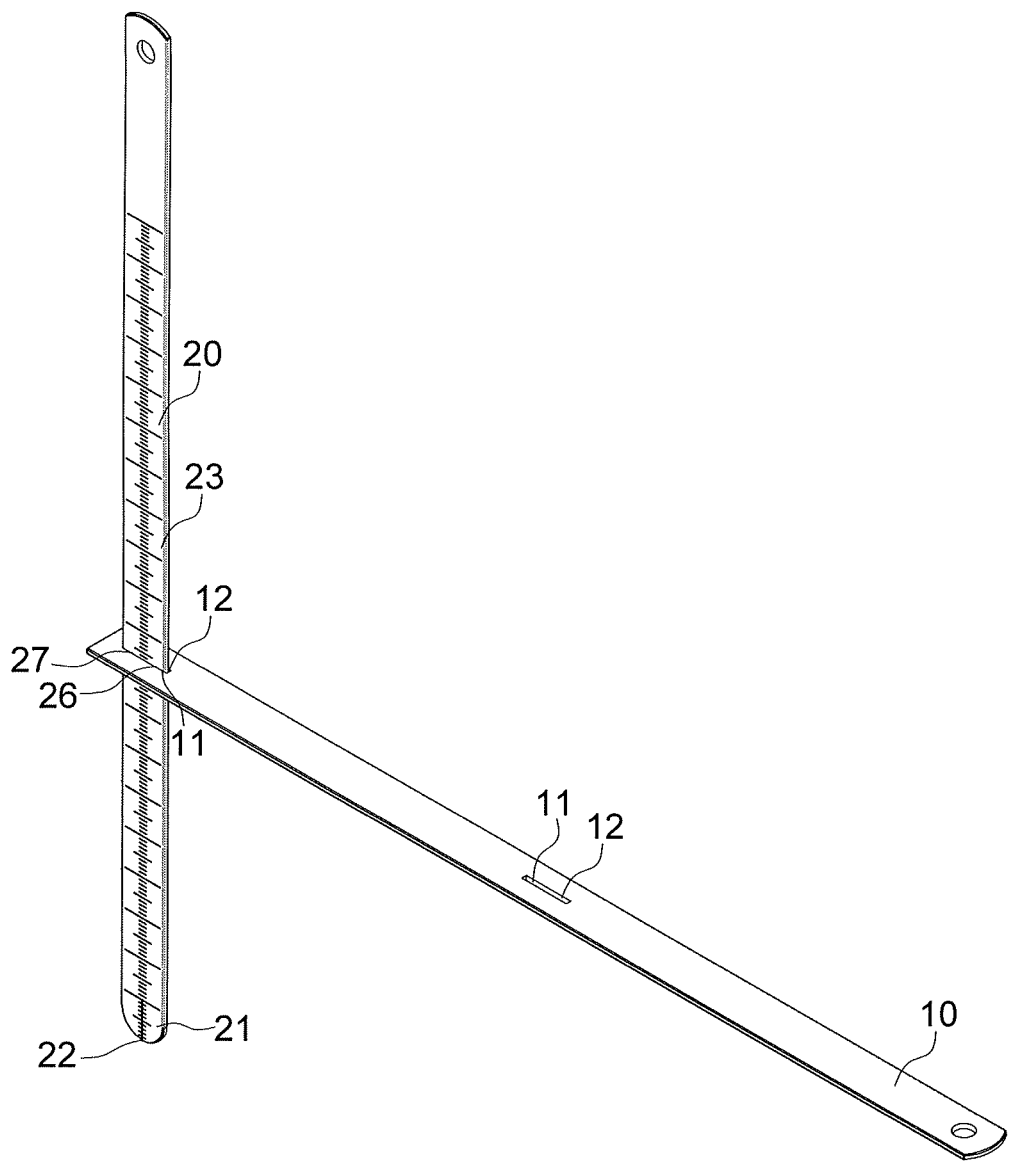
FIG. 2 shows that the ruler is located at one end of the elongated guide plate of the device of the present invention.
Figure 3:
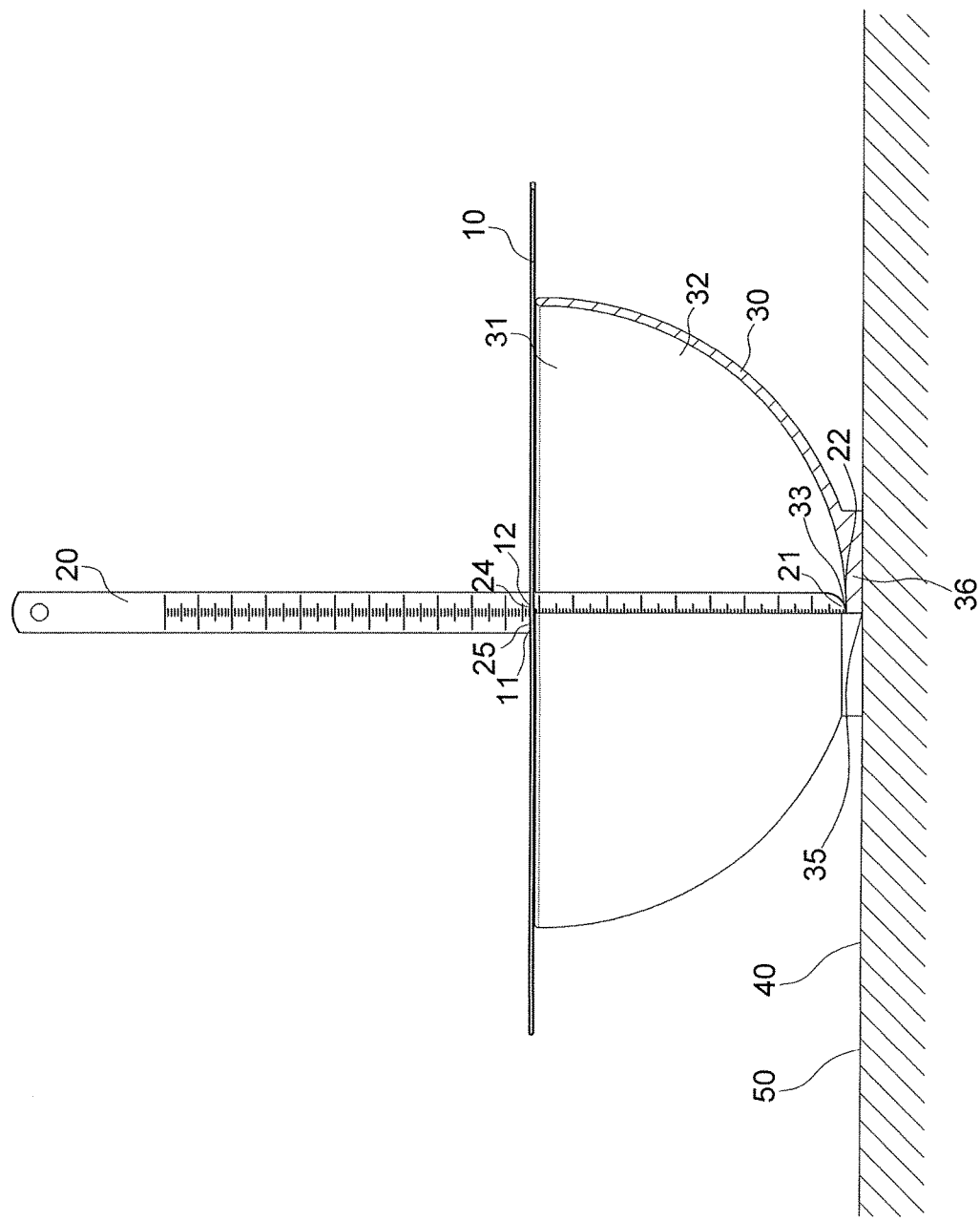
FIG. 3 is a partial cross sectional view to show that the ruler is located at the mediate portion of the elongated guide plate, and the ruler is inserted into a container.
Figure 4:
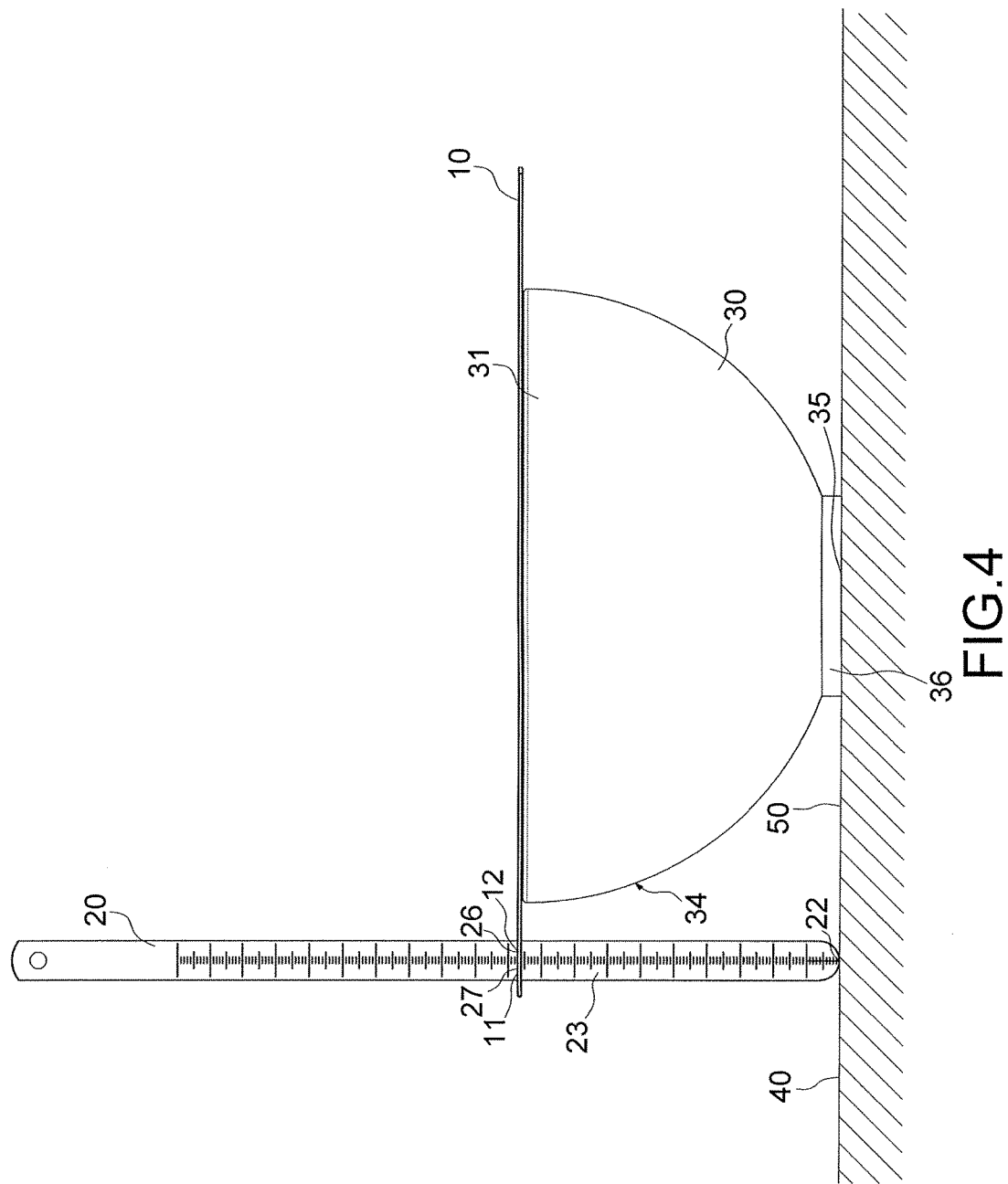
FIG. 4 is a partial cross sectional view to show that the ruler is located at one end of the elongated guide plate, and the ruler is located at the exterior of the container.
Figure 5:
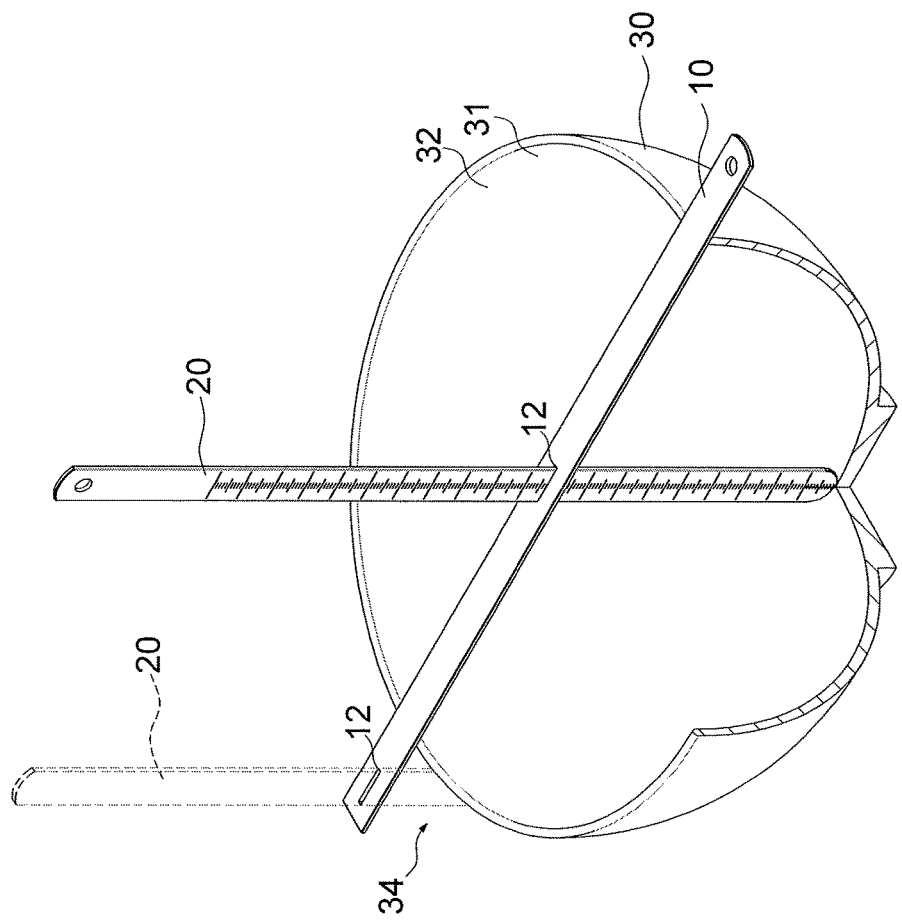
FIG. 5 illustrates that the ruler is located at different positions of the elongated guide plate.

Referring to FIGS. 1 to 5, the device for measuring thickness of bottom of an object comprises an elongated guide plate 10 and at least one elongated ruler 20. The elongated guide plate 10 is transversely mounted on the open top 31 of a container 30. The at least one elongated ruler 20 is inserted into the interior 32 of the container 30 from the open top 31 of the container 30. When the end face 22 of the distal end 21 of the at least one elongated ruler 20 contacts the inner end 33 of the interior 32, the mediate section 23 of the at least one elongated ruler 20 contacts the elongated guide plate 10. The elongated guide plate 10 has a guide portion 11 that points a first position 24 of the mediate section 23 to obtain a first index 25.

Then, the at least one elongated ruler 20 is moved to the exterior 34 of the container 30, and the end face 22 of the distal end 21 of the at least one elongated ruler 20 contacts a surface 40 which is located on a common surface 50 with the underside 35 of the exterior 34 of the container 30. The mediate section 23 of the at least one elongated ruler 20 contacts the elongated guide plate 10, and the guide portion 11 of the elongated guide plate 10 points a second position 26 of the mediate section 23 to obtain a second index 27. The difference between the first and second indexes 25, 27 is the thickness of the bottom 36 of the container 30.

As shown in FIGS. 1 to 5, the method for measuring the thickness of the bottom of a container comprises the following steps:

step (a): transversely mounting an elongated guide plate 10 on an open top 31 of a container 30; the elongated guide plate 10 defined two through receiving holes 12 thereon, the two through receiving holes 12 being spaced apart from each other and located along a lengthwise direction of the elongated guide plate 10, each of the two holes 12 including a guide portion 11 corresponding thereto;

step (b): inserting at least one elongated ruler 20 into an interior 32 of the container 30 from the open top 31; the at least one elongated ruler 20 extending through one receiving hole 12;

step (c): an end face 22 of a distal end 21 of the at least one elongated ruler 20 contacting an inner end 33 of the interior 32, a mediate section 23 of the at least one elongated ruler 20 contacting the elongated guide plate 10, a guide portion 11 of the elongated guide plate 10 pointing a first position 24 of the mediate section 23 to obtain a first index 25;

step (d): the at least one elongated ruler 20 being moved to an exterior 34 of the container 30, the end face 22 of the distal end 21 of the at least one elongated ruler 20 contacting a surface 40 which is located on a common surface 50 with an underside 35 of the exterior 34 of the container 30, the mediate section 23 of the at least one elongated ruler 20 contacting the elongated guide plate 10, the guide portion 11 of the elongated guide plate 10 pointing a second position 26 of the mediate section 23 to obtain a second index 27, and step (e): a difference between the first and second indexes 25, 27 being a thickness of a bottom 36 of the container 30.

As shown in FIG. 1, the elongated guide plate 10 has at least one receiving hole 12, and the guide portion 11 is located at the periphery of the at least one receiving hole 12. The at least one elongated ruler 20 extends through the at least one receiving hole 12. In this embodiment, the at least one receiving hole 12 includes two receiving holes 12 that are spaced apart from each other and located along the lengthwise direction of the elongated guide plate 10. Each of the two receiving holes 12 includes the guide portion 11 corresponding thereto. The at least one elongated ruler 20 can extend through either of the two receiving holes 12. The two receiving holes 12 are respectively located at the middle of the elongated guide plate 10, and the other one receiving hole 12 is located at one end of the elongated guide plate 10.

A first difference is defined between the length of the at least one receiving hole 12 and the width of the at least one elongated ruler 20. The first difference is less than 3 mm (preferably less than 1 mm). The first difference is the maximum displacement that the at least one elongated ruler 20 moves within the at least one receiving hole 12 along the lengthwise direction of the elongated guide plate 10. The first difference is preferred to be small so as to increase the accuracy of measurement and to avoid the at least one elongated ruler 20 from being separated from or shifting relative to the elongated guide plate 10.

A second difference is defined between the width of the at least one receiving hole 12 and the thickness of the at least one elongated ruler 20. The second difference is less than 3 mm (preferably less than 1 mm), the second difference is the maximum displacement that the at least one elongated ruler 20 moves within the at least one receiving hole 12 along the widthwise direction of the elongated guide plate 10. The second difference is preferred to be small so as to increase the accuracy of measurement and to avoids the at least one elongated ruler 20 from being separated from or shifting relative to the elongated guide plate 10.

The width of the distal end 21 of the at least one elongated ruler 20 gradually reduces along a direction toward the end face 22. The width of the end face 22 is the smallest width so that the at least one elongated ruler 20 is easily extended through the receiving hole 12 of the elongated guide plate 10.

The at least one elongated ruler 20 includes multiple scale marks formed along the lengthwise direction thereof. The first and second indexes 25, 27 are respectively located corresponding to a first scale mark and a second scale mark. The thickness of the bottom 36 of the container 30 is a difference between the first and second scale marks.

Figure 6:
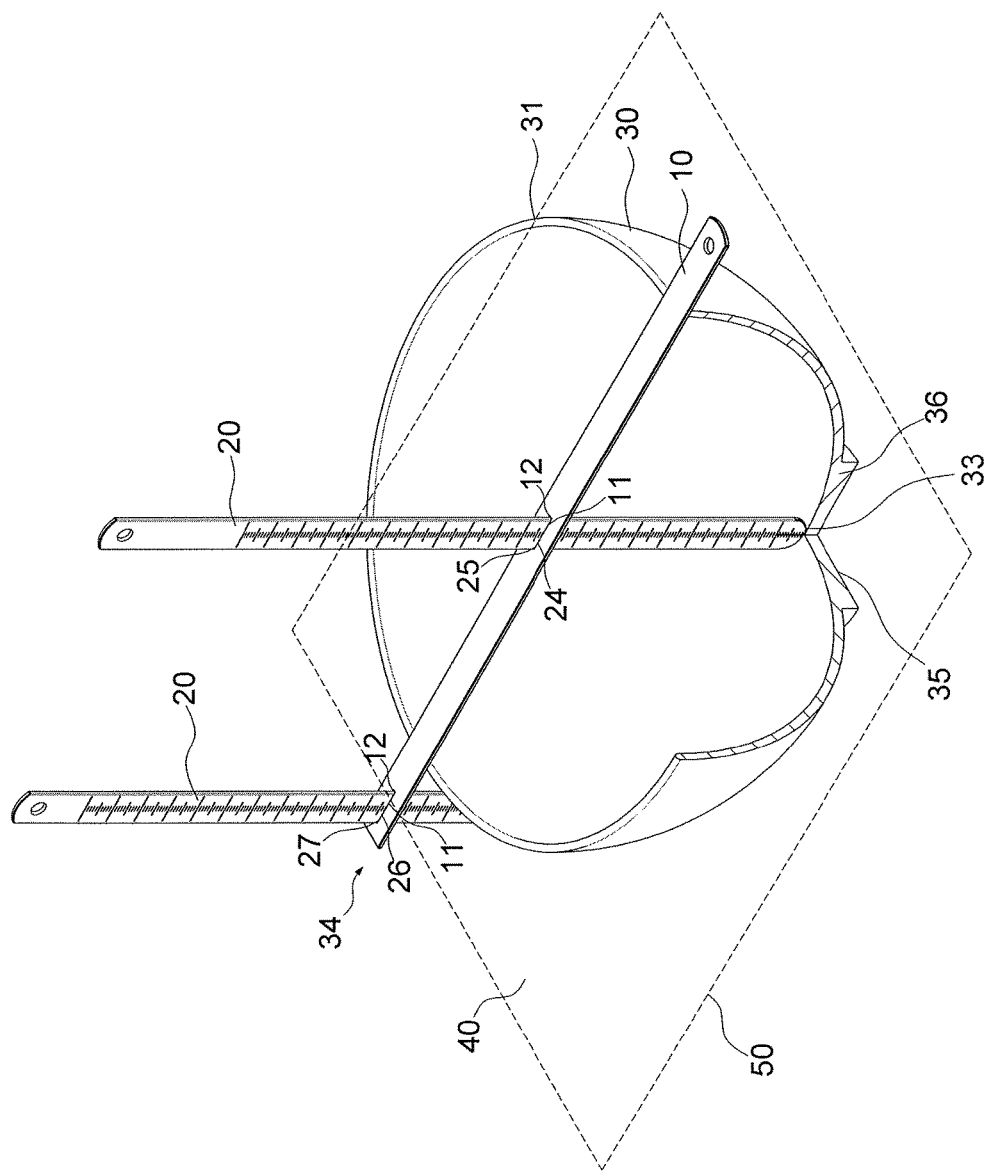
FIG. 6 illustrates the second embodiment wherein two rulers are used and respectively located at the mediate portion and one end of the elongated guide plate.

As shown in FIG. 6, the embodiment of the method of the present invention is disclosed, wherein the at least one elongated ruler 20 includes two elongated rulers 20 which respectively extend through the two receiving holes 12. One of the two elongated rulers 20 is located in the interior 32 of the container 30, and the end face 22 of the distal end 21 of the elongated ruler 20 contacts the inner end 33 to obtain the first index 25. The other one of the two elongated rulers 20 is located at the exterior 34 of the container 30, and the end face 22 of the distal end 21 of the elongated ruler 20 located at the exterior 34 of the container 30 contacts the surface 40 to obtain the second index 27. The surface 40 is located on a common surface 50 with the underside 35 of the exterior 34 of the container 30. The difference between the first and second indexes 25, 27 is the thickness of the bottom 36 of the container 30.

Figure 7:
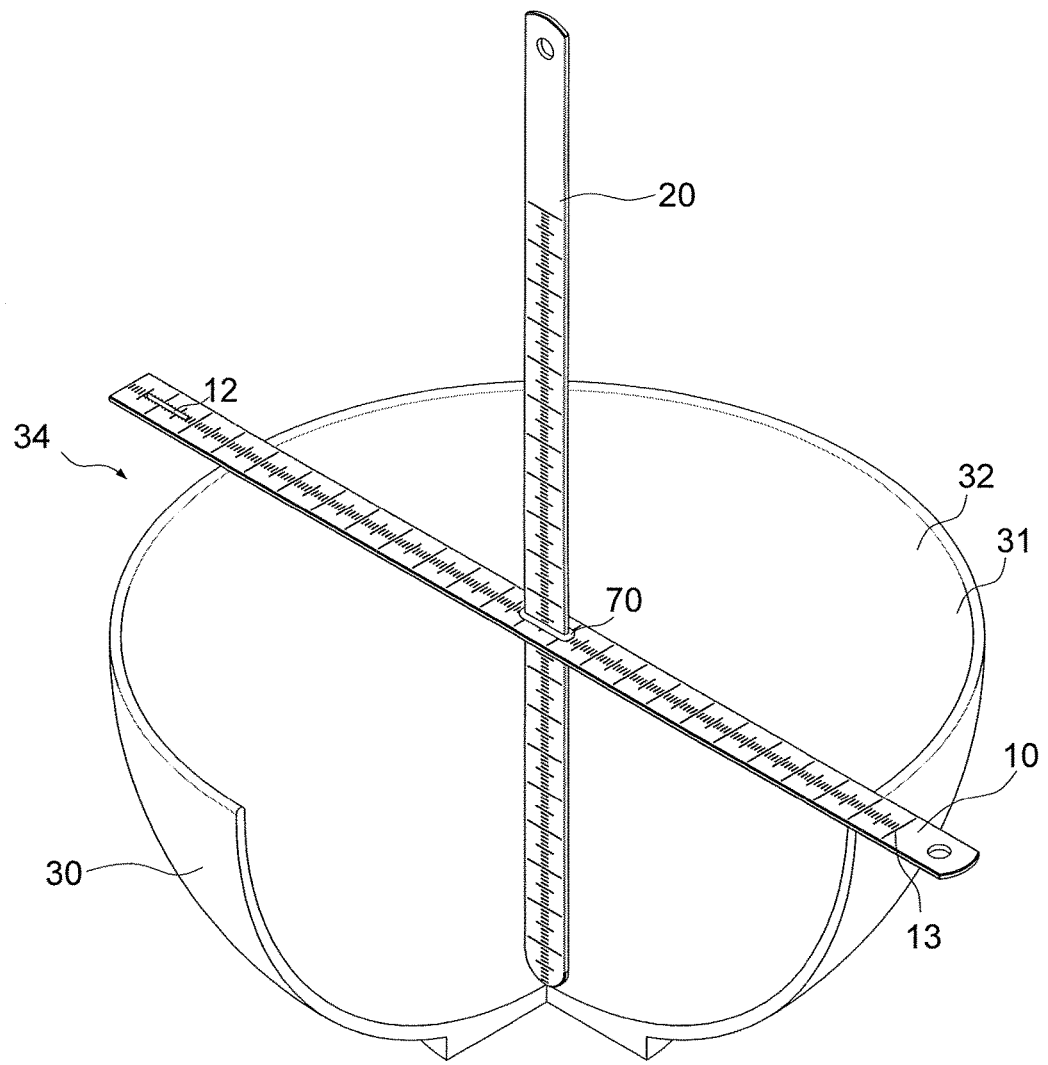
FIG. 7 illustrates the third embodiment an elastic ring mounted between the ruler and the guide plate.
Figure 8:
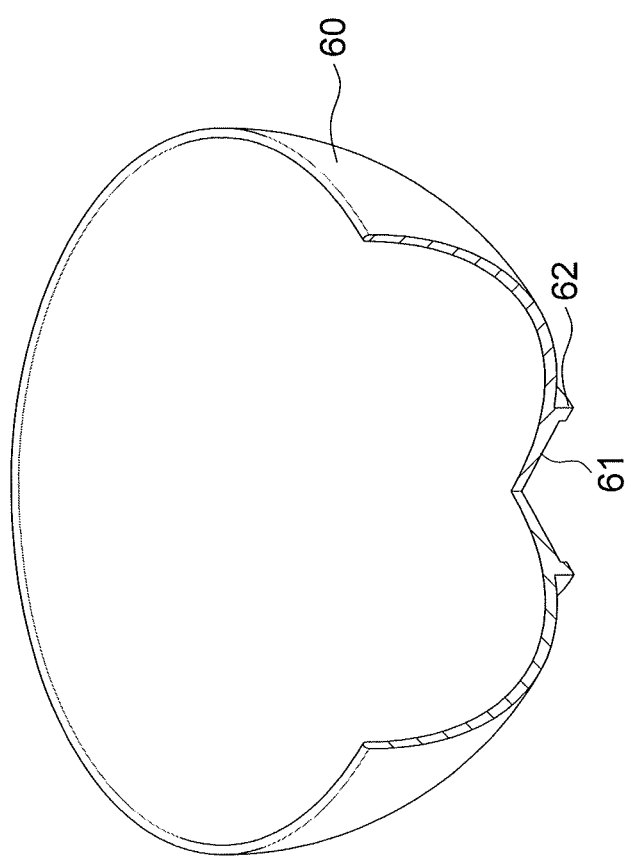
FIG. 8 shows the bottom of a container such as a bowl.

Referring to FIG. 7, the elongated guide plate 10 includes multiple scale marks 13 formed along a lengthwise direction thereof, an elastic ring 70 is mounted between the elongated guide plate 10 and the at least one elongated ruler 20, an outer periphery of the ring 70 touches an inner wall of the receiving hole 12 and an inner periphery of the ring 70 touches an outer wall of the elongated ruler 20, so that the ring 70 fixedly connects the elongated guide plate 10 and the at least one elongated ruler 20 in a cross shape. Thereby, the user can measure the diameter of the open top 31 of the container 30 by the scale marks 13 of the elongated guide plate 10, and the user can make several containers 30 with diameters of open top 31 and depths as similar as possible.

While we have shown and described the embodiment in accordance with the present invention, it should be clear to those skilled in the art that further embodiments may be made without departing from the scope of the present invention.

What is claimed is:

1. A device for measuring thickness of bottom of an object, comprising:

an elongated guide plate adapted to be transversely mounted on an open top of a container; the elongated guide plate defined two through receiving holes thereon, the two through receiving holes being spaced apart from each other and located along a lengthwise direction of the elongated guide plate, each of the two holes including a guide portion corresponding thereto;

at least one elongated ruler adapted to be extended through one receiving hole and inserted into an interior of the container from the open top of the container, an end face of a distal end of the at least one elongated ruler adapted to contact an inner end of the interior, a mediate section of the at least one elongated ruler contacting the guide portion of the elongated guide plate so that the guide portion points a first position of the mediate section to obtain a first index, and the at least one elongated ruler is adapted to move to an exterior of the container and to extend through another one receiving hole, the end face of the distal end of the at least one elongated ruler adapted to contact a surface which is located on a common surface with an underside of the exterior of the container, the mediate section of the at least one elongated ruler contacts the guide portion of the elongated guide plate so that the guide portion points a second position of the mediate section to obtain a second index, a difference between the first and second indexes is a thickness of a bottom of the container.

2. The device as claimed in claim 1, wherein the at least one elongated ruler includes two elongated rulers which respectively extend through the two holes, one of the two elongated rulers is adapted to be located in the interior of the container, the end face of the distal end of the elongated ruler is adapted to contact the inner end to obtain the first index, the other one of the two elongated rulers is adapted to be located at the exterior of the container, the end face of the distal end of the elongated ruler adapted to be located at the exterior of the container is adapted to contact the surface to obtain the second index.

3. The device as claimed in claim 1, wherein a first difference is defined between a length of the receiving hole and a width of the at least one elongated ruler, the first difference is less than 3 mm, the first difference is a maximum displacement that the at least one elongated ruler moves within the receiving hole along the lengthwise direction of the elongated guide plate.

4. The device as claimed in claim 1, wherein a second difference is defined between a width of the receiving hole and a thickness of the at least one elongated ruler, the second difference is less than 3 mm, the second difference is a maximum displacement that the at least one elongated ruler moves within the receiving hole along the widthwise direction of the elongated guide plate.

5. The device as claimed in claim 1, wherein a width of the distal end of the at least one elongated ruler reduces along a direction toward the end face.

6. The device as claimed in claim 1, wherein the at least one elongated ruler includes multiple scale marks formed along a lengthwise direction thereof, the first and second indexes are respectively located corresponding to a first scale mark and a second scale mark, the thickness of the bottom of the container is a difference between the first and second scale marks.

7. The device as claimed in claim 1, wherein the elongated guide plate includes multiple scale marks formed along a lengthwise direction thereof, an elastic ring is mounted between the elongated guide plate and the at least one elongated ruler, an outer periphery of the ring touches an inner wall of the receiving hole and an inner periphery of the ring touches an outer wall of the elongated ruler, so that the ring fixedly connects the elongated guide plate and the at least one elongated ruler in a cross shape.

8. A method for measuring a thickness of a bottom of a container, comprising:
step (a): transversely mounting an elongated guide plate on an open top of a container; the elongated guide plate defined two through receiving holes thereon, the two through receiving holes being spaced apart from each other and located along a lengthwise direction of the elongated guide plate, each of the two holes including a guide portion corresponding thereto;
step (b): inserting at least one elongated ruler into an interior of the container from the open top; the at least one elongated ruler extending through one receiving hole;
step (c): an end face of a distal end of the at least one elongated ruler contacting an inner end of the interior, a mediate section of the at least one elongated ruler contacting the elongated guide plate, a guide portion of the elongated guide plate pointing a first position of the mediate section to obtain a first index;
step (d): the at least one elongated ruler being moved to an exterior of the container, the at least one elongated ruler extending through another one receiving hole, the end face of the distal end of the at least one elongated ruler contacting a surface which is located on a common surface with an underside of the exterior of the container, the mediate section of the at least one elongated ruler contacting the elongated guide plate, the guide portion of the elongated guide plate pointing a second position of the mediate section to obtain a second index, and
step (e): a difference between the first and second indexes being a thickness of a bottom of the container.

9. The method as claimed in claim 8, wherein the guide portion is located at a periphery of the receiving hole.

10. The method as claimed in claim 8, wherein a first difference is defined between a length of the at least one receiving hole and a width of the at least one elongated ruler, the first difference is less than 3 mm, the first difference is a maximum displacement that the at least one elongated ruler moves within the at least one receiving hole along the lengthwise direction of the elongated guide plate.

11. The method as claimed in claim 8, wherein a second difference is defined between a width of the at least one receiving hole and a thickness of the at least one elongated ruler, the first difference is less than 3 mm, the second difference is a maximum displacement that the at least one elongated ruler moves within the at least one receiving hole along the widthwise direction of the elongated guide plate.

12. The method as claimed in claim 8, wherein a width of the distal end of the at least one elongated ruler reduces along a direction toward the end face.

13. The method as claimed in claim 8, wherein the at least one elongated ruler includes multiple scale marks formed along a lengthwise direction thereof, the first and second indexes are respectively located corresponding to a first scale mark and a second scale mark, the thickness of the bottom of the container is a difference between the first and second scale marks.

14. The method as claimed in claim 8, wherein the elongated guide plate includes multiple scale marks formed along a lengthwise direction thereof, an elastic ring is mounted between the elongated guide plate and the at least one elongated ruler, an outer periphery of the ring touches an inner wall of the receiving hole and an inner periphery of the ring touches an outer wall of the elongated ruler, so that the ring fixedly connects the elongated guide plate and the at least one elongated ruler in a cross shape.

* * * * *